United States Patent
Lee et al.

(10) Patent No.: US 7,778,477 B2
(45) Date of Patent: Aug. 17, 2010

(54) IMAGE DISPLAY ENCODING AND/OR DECODING SYSTEM, MEDIUM, AND METHOD

(75) Inventors: Sangjo Lee, Suwon-si (KR); Shihwa Lee, Seoul (KR); Wooshik Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1007 days.

(21) Appl. No.: 11/520,745

(22) Filed: Sep. 14, 2006

(65) Prior Publication Data

US 2007/0065023 A1  Mar. 22, 2007

(30) Foreign Application Priority Data

Sep. 20, 2005  (KR) .................. 10-2005-0087277

(51) Int. Cl.
*G06K 9/36* (2006.01)
*G06K 9/38* (2006.01)
*G06K 9/46* (2006.01)

(52) U.S. Cl. ...................... 382/246; 382/251

(58) Field of Classification Search ............... 382/164, 382/173, 232, 233, 244, 240, 246, 248, 250, 382/251, 276, 277, 305; 375/240.01, 240.03, 375/240.08, 240.1, 240.11, 240.18, 240.19, 375/240.27, E7.144; 348/426.1, 721; 341/65, 341/67, 82, 106; 345/502
See application file for complete search history.

(56) References Cited

U.S. PATENT DOCUMENTS

| | | | | |
|---|---|---|---|---|
| 5,777,812 A * | 7/1998 | Kim | ............................ | 360/48 |
| 5,850,482 A * | 12/1998 | Meany et al. | ............... | 382/232 |
| 5,901,250 A * | 5/1999 | Ohara | ........................ | 382/246 |
| 6,222,467 B1* | 4/2001 | Moon | ........................... | 341/82 |
| 6,414,608 B1* | 7/2002 | Nishida et al. | ................ | 341/67 |
| 6,898,325 B2* | 5/2005 | Gormish | ..................... | 382/248 |
| 6,925,209 B2* | 8/2005 | Boliek et al. | ................ | 382/239 |
| 6,983,075 B2* | 1/2006 | Schwartz et al. | ........... | 382/251 |
| 7,496,114 B2* | 2/2009 | Umezaki | .................... | 370/489 |
| 2005/0036545 A1* | 2/2005 | Zhou | ..................... | 375/240.03 |
| 2006/0133479 A1* | 6/2006 | Chen et al. | ............. | 375/240.03 |
| 2006/0285587 A1* | 12/2006 | Luo et al. | ................ | 375/240.2 |
| 2007/0065023 A1* | 3/2007 | Lee et al. | .................... | 382/232 |

* cited by examiner

*Primary Examiner*—Amir Alavi
(74) *Attorney, Agent, or Firm*—Staas & Halsey LLP

(57) ABSTRACT

A display image encoding and/or displaying apparatus, medium, and method. The image encoding apparatus may include a transform unit, a quantizer, a clipper, and an entropy encoder. The transform unit converts image data to generate a transform block and the quantizer quantizes the transform block from the transform unit. The clipper clips some of coefficients contained in the transform block from the quantizer, and the entropy encoder performs dual entropy coding using VLC or FLC on the transform block from the clipper.

37 Claims, 11 Drawing Sheets

| DC0 | AC1 | AC2 | AC3 | AC4 | AC5 | AC6 | AC7 |

| DC0 | AC1 | AC2 | AC3 | AC4' | AC5' | AC6' | AC7' |

310            330

IMAGE DISPLAY ENCODING AND/OR DECODING SYSTEM, MEDIUM, AND METHOD

CROSS-REFERENCE TO RELATED APPLICATIONS

This application claims the benefit of Korean Patent Application No. 10-2005-0087277, filed on Sep. 20, 2005, in the Korean Intellectual Property Office, the disclosure of which is incorporated herein in its entirety by reference.

BACKGROUND OF THE INVENTION

1. Field of the Invention

An embodiment of the present invention relates to image encoding and/or decoding, and more particularly, to a display image encoding and/or decoding system, medium, and method selectively using variable length coding (VLC) and fixed length coding (FLC) in a dual manner, and may further include the same as a display driving circuit, system, medium, and method.

2. Description of the Related Art

Multimedia devices, such as mobile phones, personal digital assistants (PDAs), digital cameras, and notebooks, may implement video graphic array (VGA) resolutions of 640×480 or 480×460, e.g., through liquid crystal displays (LCD) or an organic light emitting devices (OLED). Such display devices receive image data from a display driving circuit having memory to display an image. In such devices, to be displayed image data may be sequentially input to and stored in the memory before being displayed.

Recently, as the sizes of image data that can be displayed by the display devices have increased, high resolutions and multi-gray scales are required to display images and memory sizes have increased for storing the image data. In this case, however, there is a corresponding increase in the size of the display driving circuit, resulting in increased manufacturing costs.

SUMMARY OF THE INVENTION

An embodiment of the present invention provides an image encoding and/or decoding system, medium, and method to generate a bitstream by selectively applying VLC and FLC in a dual manner, so as to reduce entropy complexity.

An embodiment of the present invention further provides such an encoding and/or decoding apparatus, medium, and method being embodied as a display driving apparatus, capable of using low memory sizes.

Additional aspects and/or advantages of the invention will be set forth in part in the description which follows and, in part, will be apparent from the description, or may be learned by practice of the invention.

To achieve the above and/or other aspects and advantages, embodiments of the present invention include an image encoding system, including a transform unit to transform image data to generate a transform block, a quantizer to quantize the transform block, a clipper to clip coefficients in the quantized transform block, and an entropy encoder to selectively perform dual entropy coding of AC transform coefficients of the transform block with clipped coefficients using VLC (variable length coding) and FLC (fixed length coding) to generate an encoded image bitstream.

The clipper may clip a plurality of AC coefficients of the quantized transform block that correspond to high frequencies.

Here, the clipper may further clip the plurality of AC coefficients into different ranges based on a bit depth used in the quantizer.

The entropy encoder may perform the FLC on a DC coefficient and clipped AC coefficients.

Similarly, the entropy encoder may perform the VLC on unclipped AC coefficients of the transform block with clipped coefficients.

The entropy encoder may group variable length decoded coefficients separate from fixed length decoded coefficients to generate the bitstream.

To achieve the above and/or other aspects and advantages, embodiments of the present invention include an image encoding method, including transforming image data to generate a transform block, quantizing the transform block, clipping coefficients in the quantized transform block, and selectively performing dual entropy coding of AC transform coefficients of the transform block with clipped coefficients using VLC and FLC to generate a bitstream.

The clipping of the coefficients may include clipping a plurality of AC coefficients that correspond to high frequencies. Here, the clipping of the coefficients may further include clipping the plurality of AC coefficients into different ranges based on a bit depth used in the quantizer.

The performing of the dual entropy coding may include performing the FLC on a DC coefficient and clipped AC coefficients. Similarly, the performing of the dual entropy coding may include performing the VLC on unclipped AC coefficients of the transform block with clipped coefficients.

The performing of the dual entropy coding may include grouping variable length decoded coefficients separately from fixed length decoded coefficients to generate the bitstream.

To achieve the above and/or other aspects and advantages, embodiments of the present invention include an image decoding system, including an entropy decoder to selectively perform dual entropy decoding using VLD (variable length decoding) and FLD (fixed length decoding) on a bitstream generated by selective performing of dual entropy coding using VLC and FLC on AC coefficients from a transform block, an inverse clipper to inversely clip entropy-decoded data from the entropy decoder based on clipping information, an inverse quantizer to inversely quantize inversely clipped entropy-decoded data to generate inversely quantized data, and an inverse transform unit to inversely transform the inversely quantized data to recover image data encoded into the bitstream.

The entropy decoder may perform the FLD on DC coefficients and AC coefficients identified as previously having been clipped during encoding, the encoding clipping having been performed after a quantization operation of the transform block during the encoding of the bitstream.

Here, the entropy decoder may further apply a pipe line process during the VLD.

The entropy decoder may still further perform the VLD on AC coefficients indicated as not having previously been clipped during encoding, with encoding clipping having been performed after a quantization operation of the transform block during the encoding of the bitstream.

In addition, the inverse clipper may selectively inversely clip fixed length decoded AC coefficients during the inverse clipping of the entropy-decoded data.

To achieve the above and/or other aspects and advantages, embodiments of the present invention include an image decoding method, including selectively performing dual entropy decoding using VLD and FLD on a bitstream generated by selective performing of dual entropy coding of VLC and FLC on AC coefficients from a transform block, to generate entropy-decoded data, inversely clipping the entropy-decoded data based on clipping information, inversely quantizing inversely clipped entropy-decoded data to generate inversely quantized data, and inversely transforming the inversely quantized data to recover image data encoded into the bitstream.

The performing of the dual entropy decoding may include performing the FLD on DC coefficients and AC coefficients identified as previously having been clipped during encoding, the clipping during encoding having been performed after a quantization operation of the transform block during the encoding of the bitstream.

Similarly, the performing of the dual entropy decoding may include performing the VLD on AC coefficients identified as previously not having been clipped during encoding, with clipping during encoding having been performed after a quantization operation of the transform block during the encoding of the bitstream.

The inversely clipping may include selectively inversely clipping variable length decoded AC coefficients.

To achieve the above and/or other aspects and advantages, embodiments of the present invention include a display driving apparatus, including an image encoder to encode an image by selectively applying VLC and FLC on AC coefficients in a transform block in a dual manner to generate a first bitstream for the encoded image, and an image decoder to selectively apply VLD and FLD in a dual manner to a second bitstream to recover pixel data of a respective encoded image for display.

Here, the second bitstream may be derived from the first bitstream.

The display driving apparatus may further include a memory to store the first bitstream generated by the image encoder, a writing controller to control the first bitstream generated by the image encoder to be written in the memory, and a reading controller to control the first bitstream stored in the memory to be read, wherein, for the selective application of VLD and FLD, the first bitstream is read from the memory under control of the reading controller.

The display apparatus may further include a line memory to store the pixel data recovered by the image decoder, and a display device to read out of the pixel data in units of line portions and to display the line portions.

The image encoder may include a transform unit to transform image data to generate a transform block, a quantizer to quantize the transform block, a clipper to clip coefficients in the quantized transform block, and an entropy encoder to selectively perform dual entropy coding of the AC transform coefficients of the transform block with clipped coefficients using the VLC and FLC on the transform to generate the encoded image first bitstream.

Further, the image decoder may include an entropy decoder to selectively perform dual entropy decoding using the VLD and FLD on the second bitstream, generated by selective performing of dual entropy coding of VLC and FLC on respective AC coefficients from a respective transform block, an inverse clipper to inversely clip entropy-decoded data from the entropy decoder based on clipping information, an inverse quantizer to inversely quantize inversely clipped entropy-decoded data to generate inversely quantized data, and an inverse transform unit to inversely transform the inversely quantized data to recover image data encoded into the second bitstream.

To achieve the above and/or other aspects and advantages, embodiments of the present invention include a display driving method, including encoding an image by selectively applying VLC and FLC on AC coefficients in a transform block in a dual manner to generate a first bitstream for the encoded image, and decoding a second bitstream by selectively applying VLD and FLD on the second bitstream in a dual manner to recover pixel data of a respective encoded image for display.

The second bitstream may be derived from the first bitstream.

In addition, the display driving method may include storing the first bitstream in a memory after the generating of the first bitstream, and reading the second bitstream from the memory for the decoding of the second bitstream.

The method may further include providing the pixel data in units of line portions to a display device to drive the display device for display of the image.

The selective applying of the VLC and the FLC may include transforming image data to generate a transform block, quantizing the transform block, clipping coefficients in the quantized transform block, and selectively performing dual entropy coding of AC transform coefficients of the transform block with clipped coefficients using VLC and FLC to generate the first bitstream.

The selective applying of the VLD and the FLD on the second bitstream may include selectively performing dual entropy decoding using VLD and FLD on the second bitstream, generated by selective performing of dual entropy coding of VLC and FLC on AC coefficients from a respective transform block to generate entropy-decoded data, inversely clipping the entropy-decoded data based on clipping information, inversely quantizing inversely clipped entropy-decoded data to generate inversely quantized data, and inversely transforming the inversely quantized data to recover image data encoded into the second bitstream.

To achieve the above and/or other aspects and advantages, embodiments of the present invention include at least one medium including an encoded image bitstream including encoded image data and control information to control a decoder in decoding the encoded image in the bitstream, with the encoded image bitstream being generated by selective applying of VLC and FLC on AC coefficients in a transform block for a line portion of a corresponding image.

To achieve the above and/or other aspects and advantages, embodiments of the present invention include at least one medium including computer readable code to control at least one processing element to implement embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
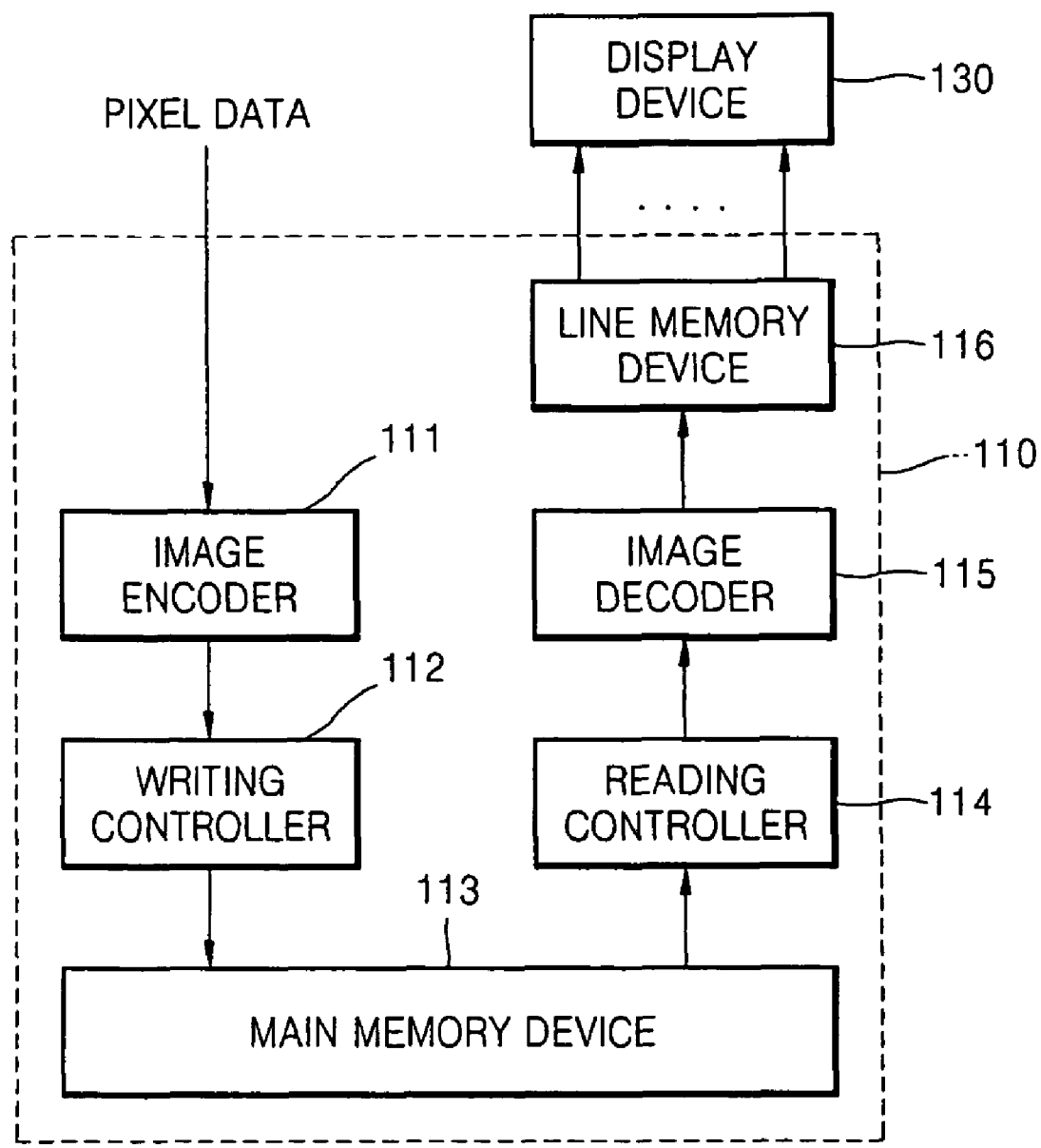
FIG. 1 illustrates a display driving circuit/system, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a display driving circuit/system 110 according to an embodiment of the present invention. The display driving circuit 110 may include an image encoder 111, a writing controller 112, a memory 113, a reading controller 114, an image decoder 115, and a line memory 116, for example.

Referring to FIG. 1, the image encoder 111 may sequentially receive image data to be displayed on a display device 130, in units of pixels, and code the image data into N bits or less, e.g., wherein N is set in advance according to the size of the main memory device 113. For example, assuming that the maximum size of data that can be stored in the memory 113 is M bits, it may be possible to set N to 80% of the M bits, for example. The image encoder 111 may also divide input image data in a unit block and code the unit block. Here, the unit block may be generated in units of lines, since image data is input sequentially in lines, e.g., in which case the image data may be processed in real-time. In one embodiment, the unit block may have four pixels or eight pixels, for example. Merely for explanation, the case where the unit block has eight pixels will be described hereafter.

A bitstream generated as a result of coding the unit block may be stored in the memory 113 under control of the writing controller 112. At this point, the image encoder 111 may apply dual entropy coding by selectively using variable length coding (VLC) and fixed length coding (FLC) so as to reduce entropy complexity during entropy coding of coefficients contained in a transform block generated by a transform of a unit block. The transform block, which may be generated by applying orthogonal transformation coding to a unit block, may have a size of 8×1 pixels or 4×1 pixels, for example. In the first case, the transform block has eight coefficients, e.g., one DC component and seven AC components, and in the latter case, the transform block includes four coefficients, e.g., one DC component and three AC components. Below, again merely for explanation purposes, the case where the transform block has 8×1 pixels will be described hereafter. Here, the transform block may be a block generated as a result of performing orthogonal transformation coding and quantization on a unit block, for example. The transform block may also be a block generated as a result of spatio-temporal prediction on a unit block and then performing orthogonal transformation coding on the unit block. Further, the transform block may be a block generated as a result of performing spatio-temporal prediction on a unit block and then performing orthogonal transformation coding and quantization on the unit block, noting that additional alternatives are equally available.

The writing controller 112 may control a bitstream, e.g., generated by the image encoder 111, to be written in the memory 113. That is, the writing controller 112 may control a writing address of the memory 113 to be set and a bitstream to be written at the set writing address.

In such a case, the memory 113 may store the bitstream generated by the image encoder 111 under control of the writing controller 112.

The reading controller 114 may control a stored bitstream to be read from the memory 113, i.e., the reading controller 114 may control a reading address of the main memory device 113 to be set and a bitstream to be read from the set reading address.

Accordingly, in one embodiment, the image decoder 115 may decode a bitstream read from the memory 113 using a process opposite to that of the image encoder 111 under control of the reading controller 114, for example, thereby recovering image data to be displayed on a display device 130. The image decoder 115 selectively applies dual entropy decoding using variable length decoding and fixed length decoding so as to reduce entropy complexity during entropy decoding.

Thus, the line memory device 116 may store the image data recovered by the image decoder 115, read the image data in unit of a line, and display the same on the display device 130.

Figure 2:
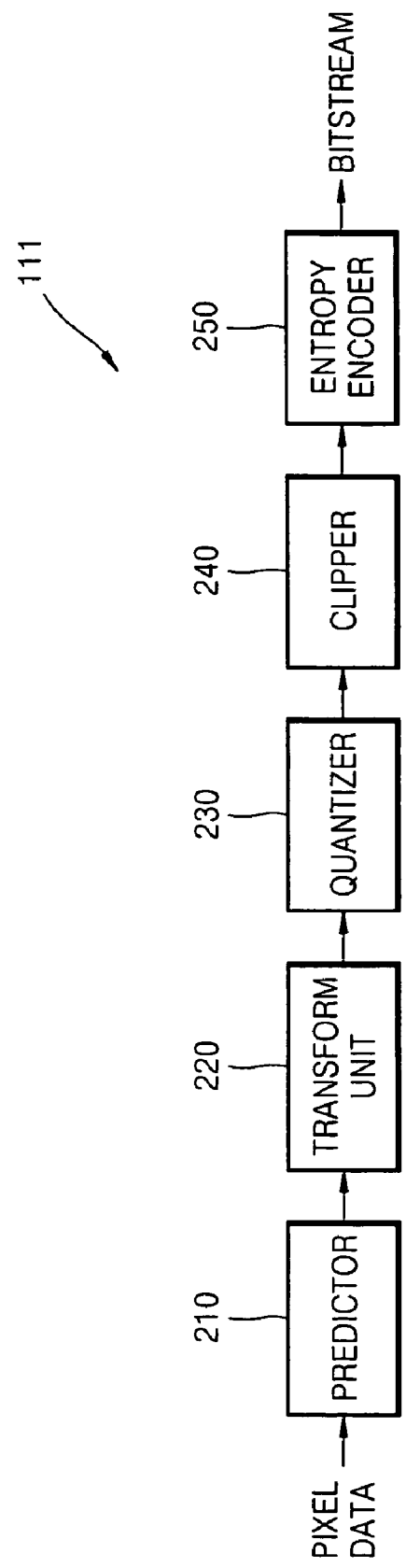
FIG. 2 illustrates an image encoder, according to an embodiment of the present invention.

FIG. 2 illustrates an image encoder according to an embodiment of the present invention. The image encoder may include a predictor 210, a transform unit 220, a quantizer 230, a clipper 240, and an entropy encoder 250, for example. Here, the predictor 210 may also be optionally provided. Though not shown, a block generator, a color transform unit, and a bit depth controller may be further provided.

Referring to FIG. 2, the block generator (not shown) divides input image data into unit blocks with a size of 8×1 pixels, for example.

The color transform unit (not shown) is provided when image data is a color image. The color transform unit transforms RGB data of each unit block YCoCg data using the below matrix calculation of Equation 1. Additionally, in alternate embodiments, the type of data to which the RGB data is color-transformed may be a type other than YCoCg. Here, overlapping between colors existing in image data may be removed by such color transformation.

$$\text{Equation 1:} \begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} = \begin{bmatrix} R \\ G \\ B \end{bmatrix}$$

The predictor 210 may perform spatio-temporal prediction on the color-transformed YCoCg data or on black/white image data and provide the predicted results to the transform unit 220. It also possible to remove spatio-temporal overlapping existing in image data using such spatio-temporal prediction.

The transform unit 220 may perform the transform on data where spatio-temporal overlapping is removed through prediction coding by the predictor 210, for example, and provide the transform block generated by the transform to the quantizer 230. At this point, the transform method may be orthogonal transformation coding, for example. Orthogonal transformation coding can include fast Fourier transform, discrete cosine transform, Karhunen Loeve transform, Hadamard transform, and slant transform, for example. Here, as an example, the Hadamard transform having the least operation complexity may be used for processing image data in realtime. The Hadamard transform may remove overlapping between pixels contained in a unit block of 8×1 pixels using the below matrix calculation of Equation 2.

$$\text{Equation 2:} \begin{bmatrix} c_0 \\ c_1 \\ c_2 \\ c_3 \\ c_4 \\ c_5 \\ c_6 \\ c_7 \end{bmatrix} = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix} \begin{bmatrix} p_0 \\ p_1 \\ p_2 \\ p_3 \\ p_4 \\ p_5 \\ p_6 \\ p_7 \end{bmatrix}$$

In Equation 2, p0, p1, p2, p3, p4, p5, p6, p7 are values of pixels contained in a unit block of 8×1 and c0, c1, c2, c3, c4, c5, c6, c7, are the results of the Hadamard transform of the pixel values.

The quantizer 230 may further quantize the transform block from the transform unit 220 according to a bit depth. Quantization may be dead zone type quantization, though the quantization is not limited thereto. According to such a dead zone quantization, a quantization input having a small value belonging to a predetermined dead zone is quantized to zero so as to increase the number of zeros, making it possible to increase the coding efficiency during entropy coding, particularly, during modified Huffmann Coding combined with zero run length coding.

The clipper 240 may set transform coefficients for clipping in advance and clip some of transform coefficients, and in one embodiment, AC coefficients that correspond to a high frequency portion according to a bit depth or a quantization coefficient provided together with a quantized transform block from the quantizer 230. Since an entropy encoder 250 performs fixed length coding (FLC) on some transform coefficients, the clipping may be performed to reduce the range of the transform coefficients to within a predetermined clipping range. Information regarding the transform coefficients to be clipped can be provided from outside, for example.

The entropy encoder 250 may further selectively perform FLC on DC coefficients and clipped AC coefficients and performs variable length coding (VLC) on AC coefficients, e.g., AC coefficients not clipped with respect to the transform block containing the clipped AC coefficients provided from the clipper 240. Here, it may be possible to increase parsing speed by performing FLC instead of VLC, which has a lower compression effect, on the DC coefficients. That is, the VLC may be performed on the AC coefficients that correspond to a low frequency portion and the FLC may be performed on the DC coefficients and the AC coefficients that correspond to a high frequency portion. At this point, the variable length coded coefficients and the fixed length coded coefficients may be grouped, and the grouped fixed length coded coefficients arranged at a front end of data, so that a pipe line process can be applied to the fixed length coded coefficients, particularly, the fixed length coded AC coefficients when decoding is performed. Here, in an embodiment, 8 bits may be assigned to DC coefficients, for example, and the number of bits assigned to AC coefficients may be varied depending on a bit depth and a quantization coefficient when the FLC is performed.

When the entropy encoder 250 performs entropy coding to complete coding, the bit depth controller (not shown) may compare a maximum data size, e.g., set in advance, with consideration of the size of memory, such as memory 113 of FIG. 1, with the size of resultant coded data to determine whether to control a bit depth for quantization. When the control of the bit depth is desired, the bit depth controller may control the bit depth and provide the same to the quantizer 230. For example, considering an image to be displayed having 240 lines in QVGA, the maximum number of bits occupied by coded data that corresponds to one line may be 100 bits, based on another assumption that the maximum number of storage bits of the memory is 24,000 bits. The bit depth controller may detect the number of bits coded in units of a line to compare it with the set maximum number of bits. When the number of bits coded in the unit of a line is greater than the set maximum number of bits, the bit depth controller may reduce the bit depth. Conversely, when the number of bits coded in the unit of a line is smaller than the set maximum number of bits, the bit depth controller may increase the bit depth. For example, the size of data currently stored in the memory may be smaller than the set maximum size, such that the bit depth controller may control a bit depth to a maximum bit depth.

Figures 3A, 3B:
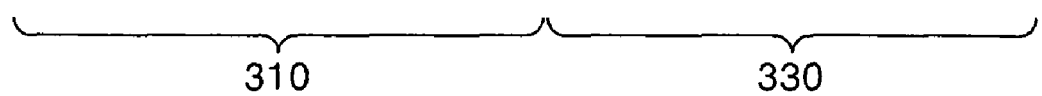
FIGS. 3A and 3B illustrate example pixel data input to a clipper and example pixel data output from the clipper, such as that of FIG. 2, respectively.

FIGS. 3A and 3B illustrate an example of pixel data input to a clipper 240 and an example of pixel data output from the clipper 240, such as in FIG. 2, respectively. In this example, when the transform unit 220 performs 1×8 discrete cosine transform (DCT) coding, for example, the quantizer 230 may quantize eight DCT coefficients containing a DC coefficient DC0 and seven AC coefficients AC1 through AC 7 with respect to a unit block, as illustrated in FIG. 3A, and provide the same to the clipper 240. The clipper 240 may clip a plurality of AC coefficients to which the FLC is to be applied, among the eight quantized DCT coefficients, with respect to the unit block, and output eight coefficients containing a group 310 having the non-clipped AC coefficients AC1 through AC3 and the DC coefficient DC0 and a group 330 having the clipped AC coefficients AC4' through AC7', as illustrated in FIG. 3B.

Figure 4A:
FIGS. 4A through 4C illustrate a method of selecting coefficients encoded through fixed length coding (FLC) for a simple image, according to an embodiment of the present invention.
Figure 4B:
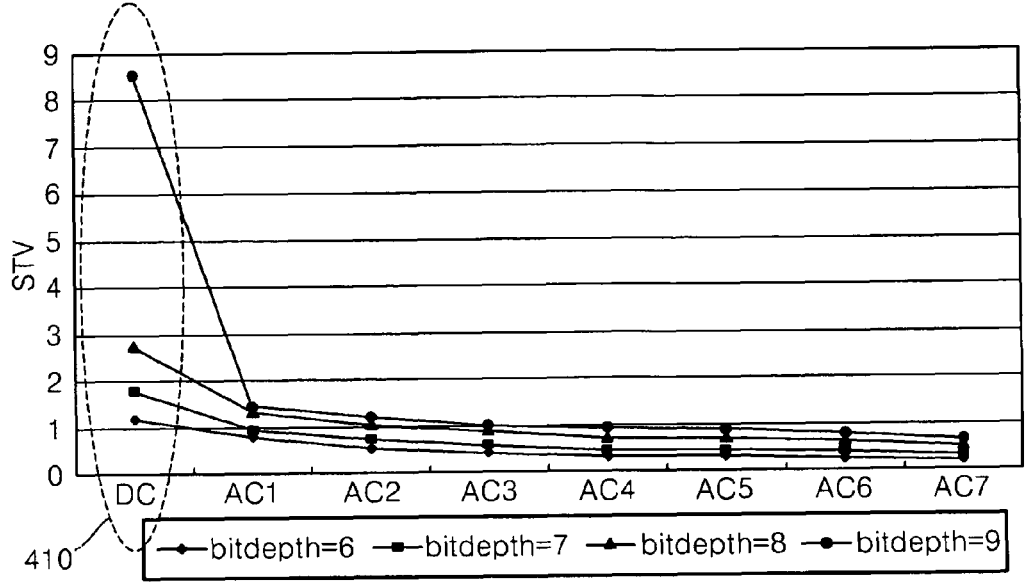
Figure 4C:
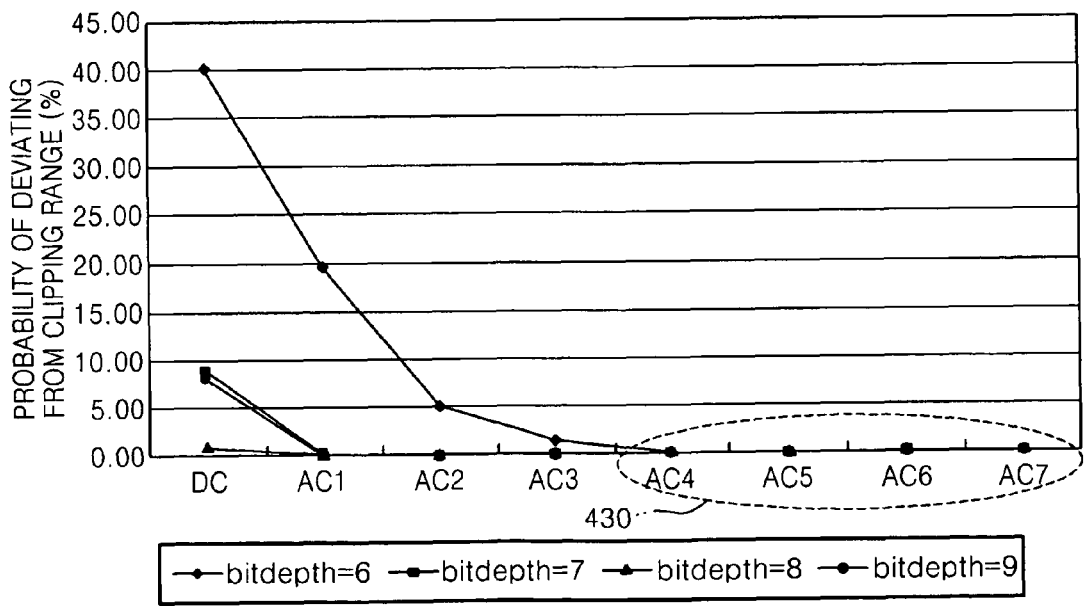

FIGS. 4A through 4C illustrate a method for selecting a coefficient so as to selectively apply FLC to a simple image, according to an embodiment of present invention. Here, FIG. 4A illustrates an example simple image, FIG. 4B illustrates the standard deviation (STV) for each coefficient when quantization is performed by applying different bit depths to a DCT coefficient, and FIG. 4C illustrates the probability that each coefficient deviates from a clipping range as a result of clipping. Referring to FIG. 4B, when a bit depth is differently set, the DC coefficient 410 corresponding to a lowest frequency band has a very large standard deviation, but the standard deviation becomes small as the frequency band approaches the high frequency band. Therefore, objects selected for clipping by the clipper 240 may be the DC coefficient 410 which has very large standard deviation, and so an efficiency of the VLC would be reduced, and a coefficient group 430 containing AC4 through AC7 (illustrated in FIG. 4C) which has very small standard deviation, and so the probability that the coefficient deviates from the number of limited bits is reduced, that is, the probability that the coefficient deviates from the clipping range is relatively small (e.g., substantially close to almost zero).

Figure 5A:
FIGS. 5A through 5C illustrate a method of selecting coefficients encoded through FLC for a complex image, according to an embodiment of the present invention.
Figure 5B:
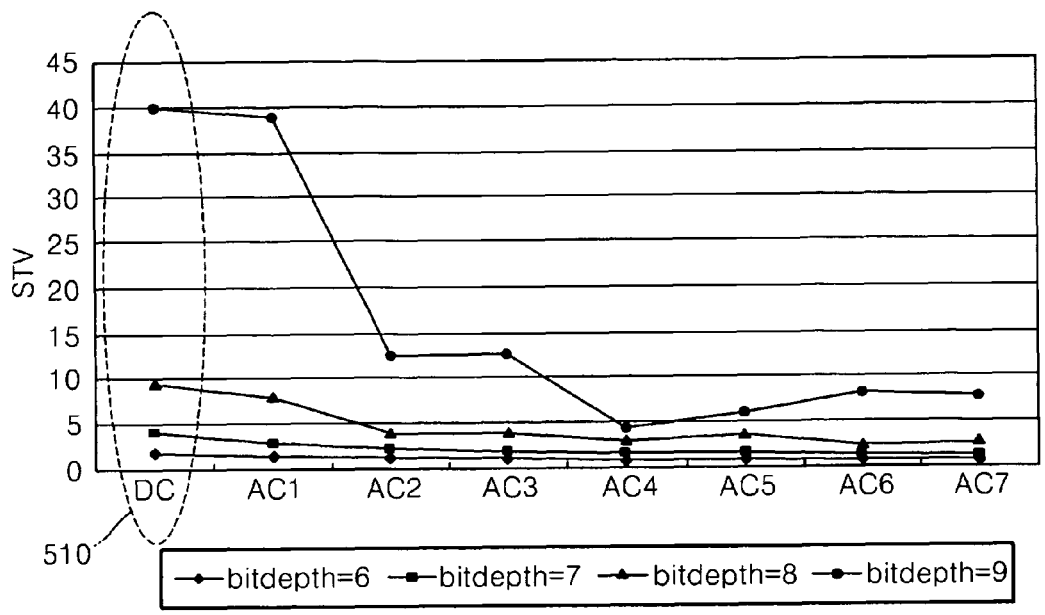
Figure 5C:
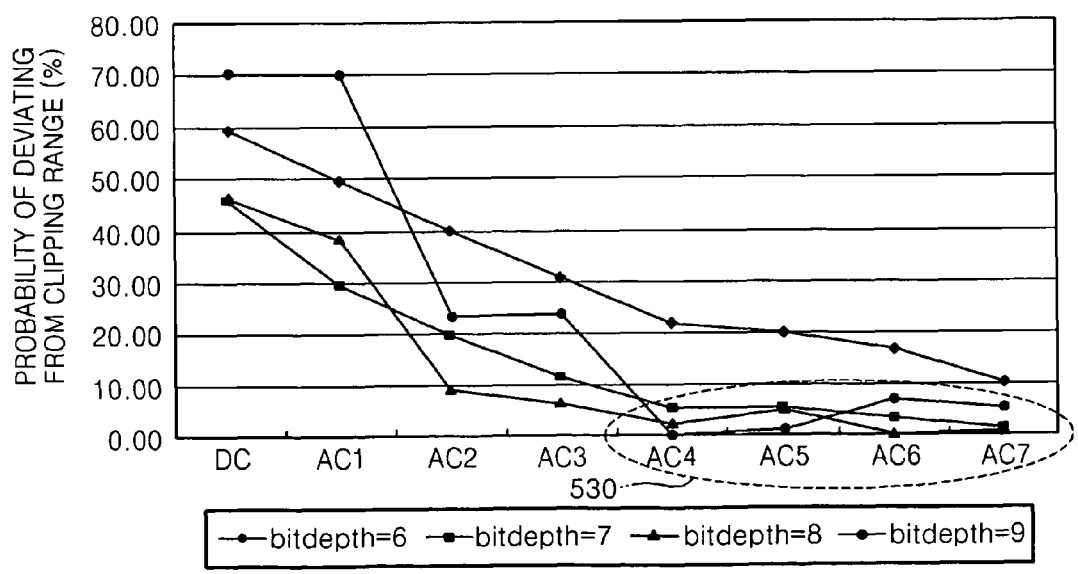

FIGS. 5A through 5C illustrate a method for selecting a coefficient so as to selectively apply FLC to a complex image, according to an embodiment of the present invention. FIG. 5A illustrates an example complex image taken, FIG. 5B illustrates the standard deviation (STV) for each coefficient when quantization is performed by applying different bit depths to a DCT coefficient, and FIG. 4C illustrates the probability that each coefficient deviates from a clipping range as a result of the clipping. Referring to FIG. 5B, when a bit depth is differently set, the DC coefficient 510 corresponding to the lowest frequency band has a very large standard deviation, but the standard deviation becomes small as the frequency band approaches the high frequency band. Therefore, objects selected for clipping by the clipper 240 may be the DC coefficient 510 which has a very large standard deviation, and so an efficiency of the VLC would be reduced, and a coefficient group 530 containing AC4 through AC7 (illustrated in FIG. 5C) which has a very small standard deviation, and so the probability that the coefficient deviates from the number of limited bits is reduced, that is, the probability that the coefficient deviates from the clipping range is relatively small (e.g., substantially close to almost zero.

Referring to FIGS. 4A through 4C and FIGS. 5A through 5C, the DC coefficient and a plurality of AC coefficients that correspond to a high frequency band where a probability that the coefficient deviates from a clipping range is relatively small may be selected as objects for clipping, regardless of the complexity of an image, that is, the number of colors expressing an image, and then the clipping and the FLC may be performed.

Figure 6:
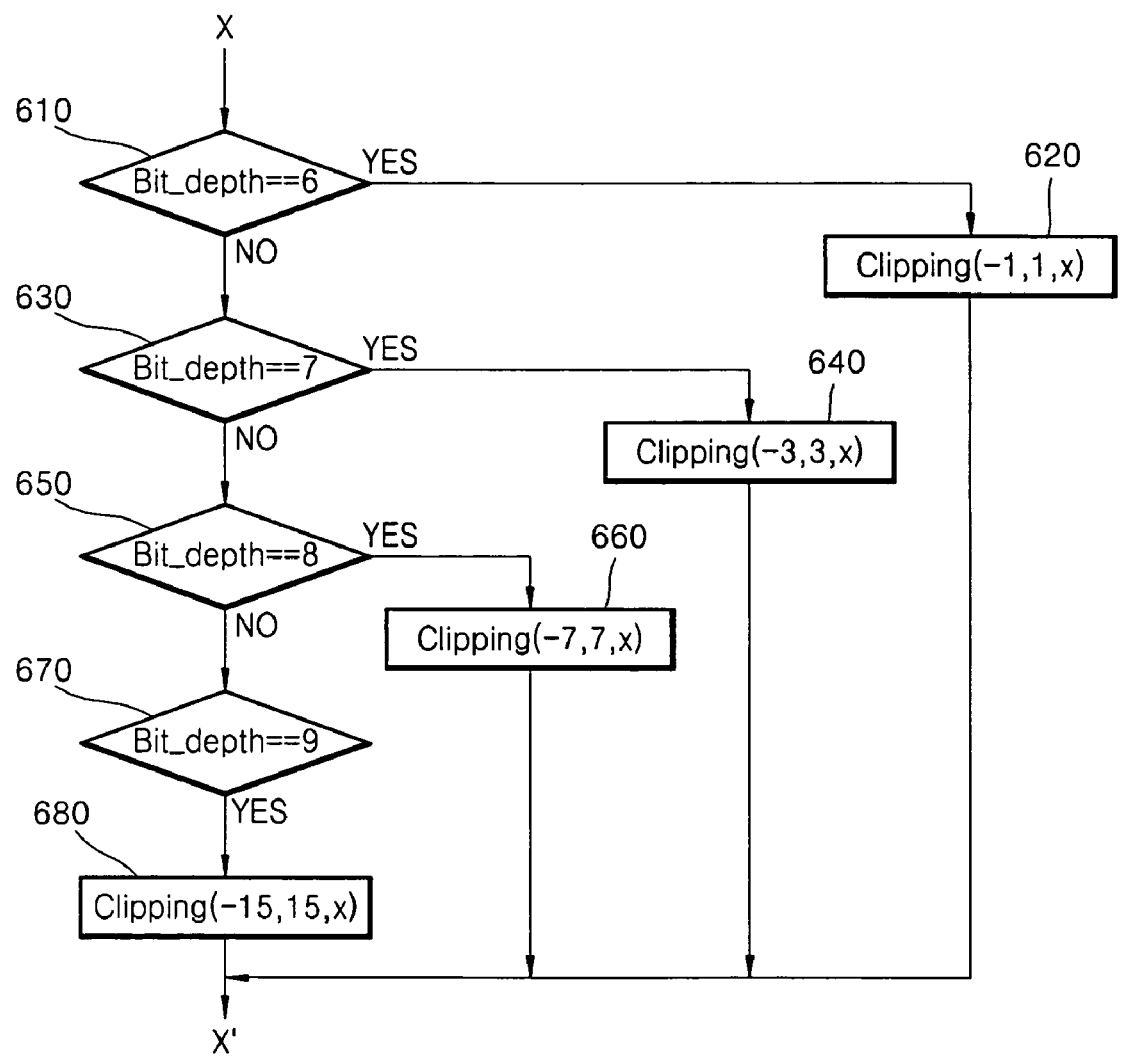
FIG. 6 illustrates an operation of a clipper 240, such as that illustrated in FIG. 2, according to an embodiment of the present invention.

FIG. 6 illustrates an operation of the clipper 240, such as the clipper 240 illustrated in FIG. 2. A plurality of AC coefficients contained in a transform block may be clipped into a predetermined clipping range according to a set or controlled bit_depth or quantized coefficient. At this point, the range of a bit_depth used for quantization may be 6 through 9 bits for example.

Referring to FIG. 6, in operation 610, whether a bit_depth designator contained in header information of a quantized transform block indicates 6 bits may be determined. For example, when the bit_depth is 6, the value x of an AC coefficient to be clipped may be clipped to −1 and 1, in operation 620. That is, when the value x of the AC coefficient is less than −1, the AC coefficient may be clipped to −1, and when the value x of the AC coefficient is greater than 1, the AC coefficient may be clipped to 1.

Whether the bit_depth designator contained in header information of the quantized transform block indicates 7 bits may further be determined, in operation 630. For example, when the bit_depth is 7 bits, the value x of an AC coefficient to be clipped may be clipped to −3 and 3, in operation 640. That is, when the value x of the AC coefficient is less than −3, the AC coefficient may be clipped to −3, and when the value x of the AC coefficient is greater than 3, the AC coefficient may be clipped to 3.

Still further, whether the bit_depth designator contained in header information of the quantized transform block indicates 8 bits may be determined, in operation 650. For example, when the bit_depth is 8 bits, the value x of an AC coefficient to be clipped may be clipped to −7 and 7, in operation 660. That is, when the value x of the AC coefficient is less than −7, the AC coefficient may be clipped to −7, and when the value x of the AC coefficient is greater than 7, the AC coefficient may be clipped to 7.

Likewise, whether the bit_depth contained in header information of the quantized transform block indicates 9 bits may be determined, in operation 670. For example, when the bit_depth is 9 bits, the value x of an AC coefficient to be clipped may be clipped to −15 and 15, in operation 680. That is, when the value x of the AC coefficient is less than −15, the AC coefficient may be clipped to −15, and when the value x of the AC coefficient is greater than 15, the AC coefficient may be clipped to 15.

Figure 7:
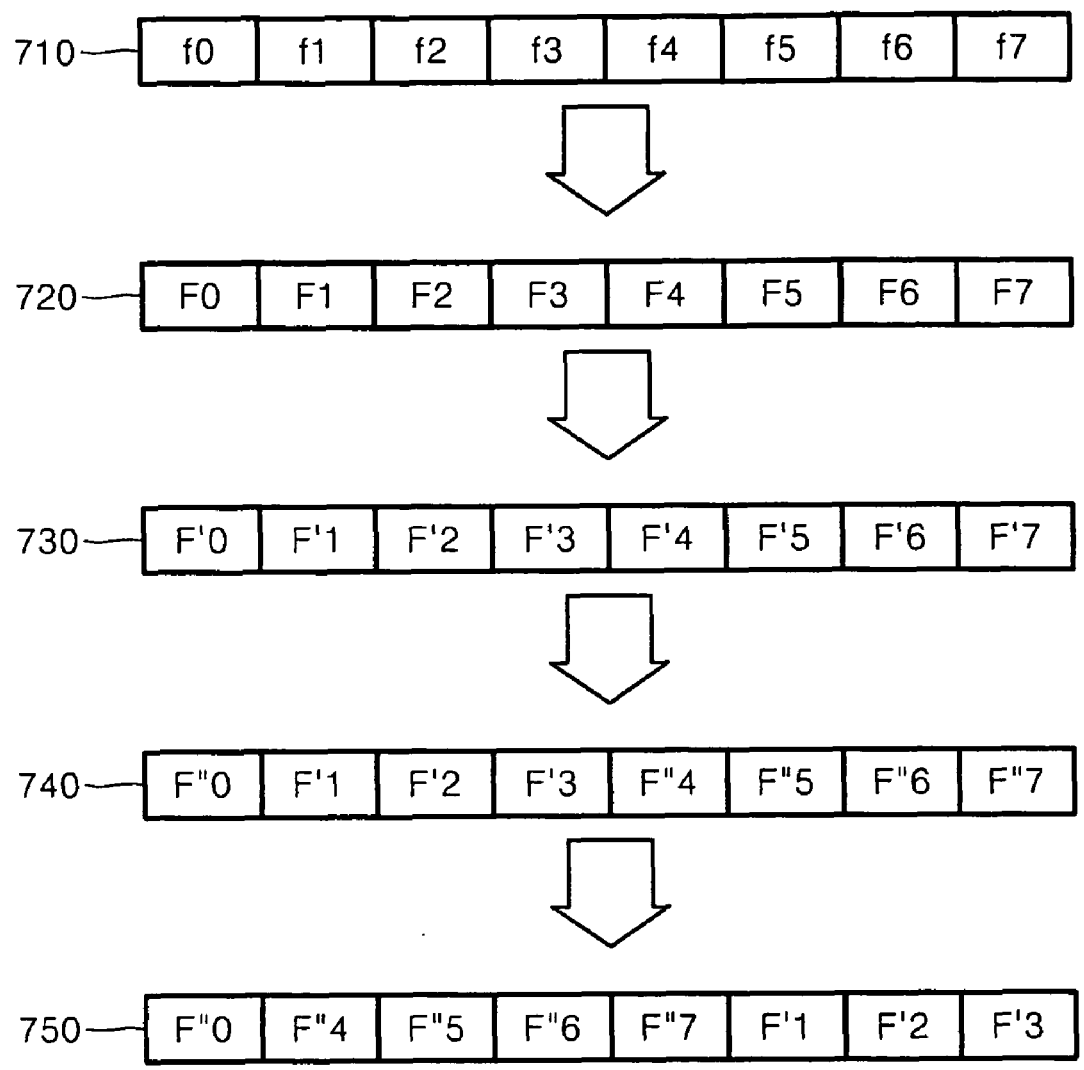
FIG. 7 illustrates an embodiment where FLC is applied to a black and white image and a transform block has 8 coefficients, according to an embodiment of the present invention.

FIG. 7 illustrating an embodiment where FLC is applied to a black/white image with a transform block having 8 coefficients, according to an embodiment of the present invention. Referring to FIG. 7, reference numeral 710 represents a unit block input into a transform unit, such as transform unit 220, reference number 720 represents a transform block provided from the transform unit, reference number 730 represents a quantized transform block, such as that provided from the quantizer 230, reference numeral 740 represents a clipped transform block, such as that clipped by the clipper 240, and reference numeral 750 represents a rearranged transform block, e.g., rearranged after the clipping. The entropy encoder 250 may, thus, selectively perform FLC on a DC coefficient F'''0 and AC coefficients AC4 through AC7 (F'''4 through F'''7), e.g., located at a front portion of a transform block 750 as rearranged after clipped by the clipper 240, and performs VLC on AC coefficients AC1 through AC3 (F'''1 through F'''3), e.g., located at a rear portion of the rearranged transform block 750.

Figure 8:
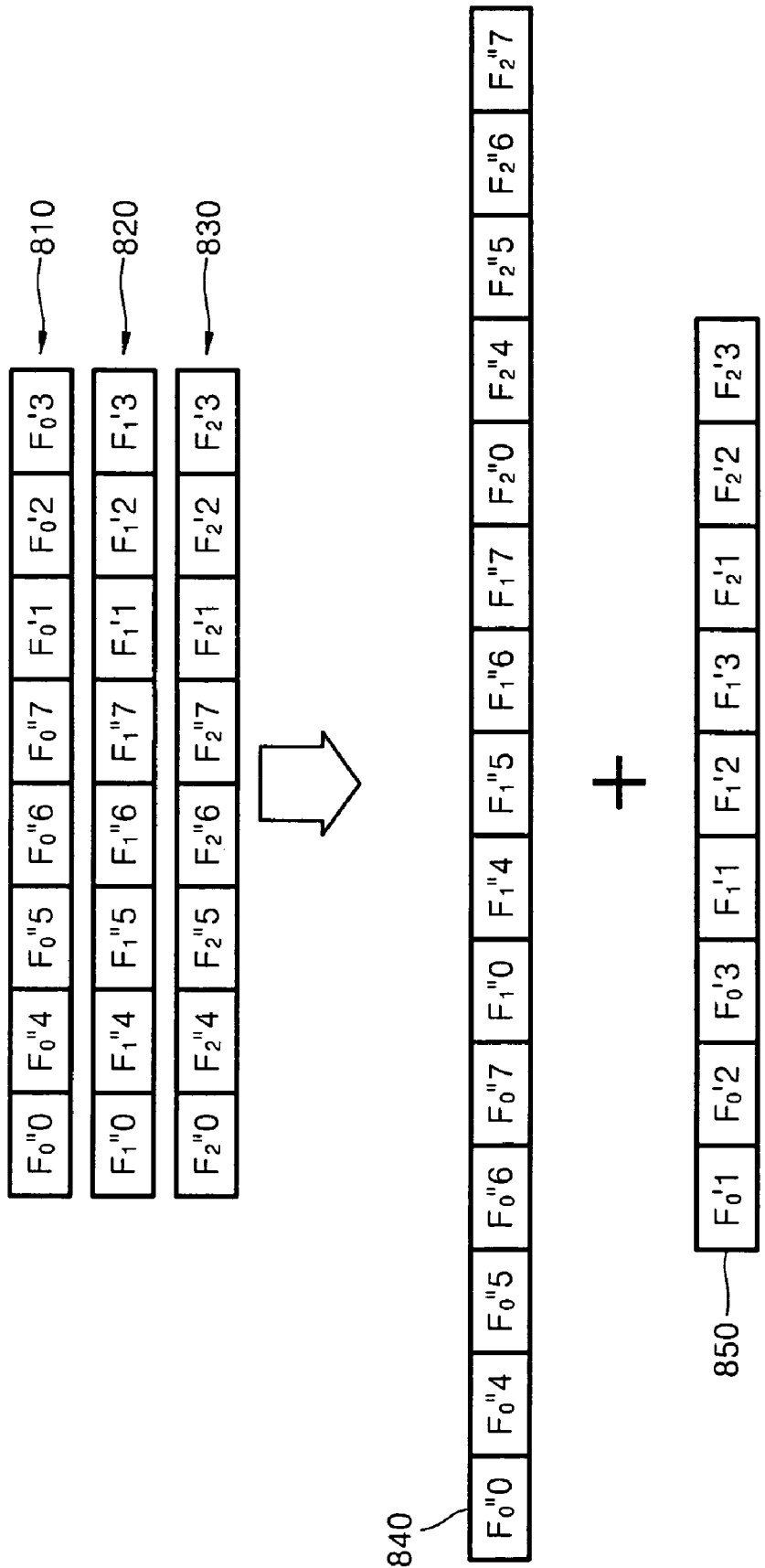
FIG. 8 illustrates an embodiment where FLC is applied to a color image and a transform block has 8 coefficients, according to an embodiment of the present invention.

FIG. 8 illustrating an embodiment where FLC is applied when the transform block has 8 coefficients and the image is a color image. For example, rearranged transform blocks 810, 820, and 830, rearranged after being clipped by the clipper 240, for example, may be rearranged again into a first partial block 840 where FLC is performed and a second partial block 850 where VLC is performed, with respect to colors 0, 1, and 2 that correspond to R, G, and B, respectively, for example. Alternate embodiments are equally available.

Figure 9:
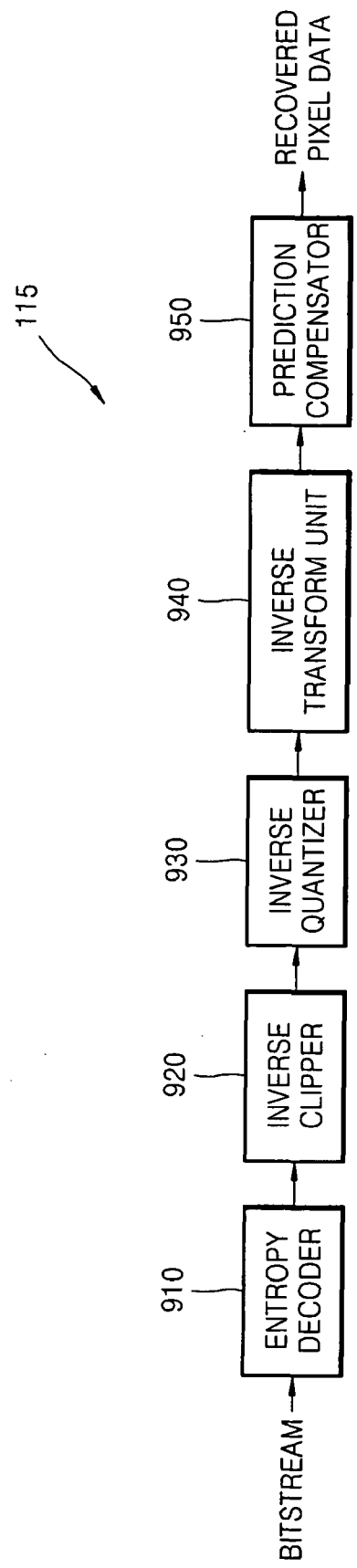
FIG. 9 illustrates an image decoder, according to an embodiment of the present invention.

FIG. 9 illustrates an image decoder, according to an embodiment of the present invention. The image decoder may include an entropy decoder 910, an inverse clipper 920, an inverse quantizer 930, an inverse transform unit 940, and a prediction compensator 950, for example. Here, the prediction compensator 950 may be an element that may be provided as an optional element, for example, so a variety of prediction compensators 950 may be used depending on coding type applied to the image encoder, e.g., such as the image encoder 111 of FIG. 1.

Referring to FIG. 9, the entropy decoder 910 may analyze a bitstream provided from memory, such as the memory 113 of FIG. 1, to extract a header portion containing various coding information for each transform block and a coded data portion from the bitstream, and perform dual entropy decoding using variable length decoding (VLD) or fixed length decoding (FLD) on the coded data portion using entropy coding information contained in the header portion. At this point, a pipe line process may be applied to fixed length coded coefficients, particularly, fixed length coded AC coefficients, for example.

The inverse clipper 920 may inversely clip entropy-decoded data from the entropy decoder 910 using clipping information contained in the header portion.

Thereafter, the inverse quantizer 930 may inversely quantize data inversely clipped by the inverse clipper 920, and the inverse transform unit 940 may then inversely transform the inversely quantized data to recover image data.

After spatio-temporal prediction has been performed, for example, by the image encoder, the prediction compensator 950 may perform spatio-temporal prediction compensation to recover image data.

In a display driving circuit applying a compression technology, it may be desired to realize an image encoder and an image decoder using less than a hundred thousand gates, e.g., due to hardware size limitations. Also, it may further be desirable to set a processing speed so that the image encoder may process one pixel per clock cycle and the image decoder may process eight pixels per clock cycle, for example.

When the image encoder and/or image decoder are implemented as a display driving circuit, as described above, remarkable performance improvements can be achieved, as shown in the below Table 1.

TABLE 1

|  | VLC only (conventional system) | VLC + FLC (embodiment) | Improvement ratio |
| --- | --- | --- | --- |
| Number of gates | 80,000 | 60,000 | 25% |
| Processing speed (clock) | 3 | 1 | 67% |

In addition, according to differing embodiments of the present invention, an image encoding and/or decoding system, medium, and method may be included in/with multimedia devices, such as mobile phones, personal digital assistants (PDAs), digital cameras, and notebook computers, for example, and may correspondingly be implemented as/in a display driving circuit or apparatus such as for an LCD.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to embodiments of the present invention. The media may also be a distributed network, so that the computer readable code is stored/transferred and executed in a distributed fashion. Still further, as only a example, the processing element could include a processor or a computer processor, and processing elements may be distributed and/or included in a single device.

According to an embodiment of the present invention, VLC and FLC coding may be selectively applied in a dual manner, such as in a display driving circuit/apparatus that uses a compression technology, so that the length of a code word of each symbol are identical in a portion to which the FLC is applied and for parallel processes, i.e., a pipe line process, which can remarkably reduce decoding times.

In addition, the number of gates needed for making up the entropy decoder of the image decoder may be reduced over conventional systems, permitting the size of the display driving circuit to be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image encoding system, comprising:
   a transform unit to transform image data to generate a transform block;
   a quantizer to quantize the transform block;
   a clipper to clip a portion of AC coefficients in the quantized transform block; and
   an entropy encoder to selectively perform entropy coding of unclipped AC transform coefficients in the quantized transform block and clipped AC coefficients the quantized transform block using VLC (variable length coding) and FLC (fixed length coding) to generate an encoded image bitstream.

2. The system of claim 1, wherein the clipper clips a plurality of AC coefficients of the quantized transform block that correspond to high frequencies.

3. The system of claim 1, wherein the clipper further clips a plurality of AC coefficients into different ranges based on a bit depth used in the quantizer.

4. The system of claim 1, wherein the entropy encoder performs the FLC on a DC coefficient and the clipped AC coefficients in the quantized transform block.

5. The system of claim 1, wherein the entropy encoder performs the VLC on the unclipped AC coefficients in the quantized transform block.

6. The system of claim 1, wherein the entropy encoder groups variable length decoded coefficients separate from fixed length decoded coefficients to generate the bitstream.

7. An image encoding method, comprising:
   transforming, performed by a processing device, image data to generate a transform block;
   quantizing the transform block;
   clipping a portion of AC coefficients in the quantized transform block; and
   selectively performing entropy coding of unclipped AC coefficients in the quantized transform block and clipped AC coefficients in the quantized transform block using VLC and FLC and generating a bitstream.

8. The method of claim 7, wherein the clipping of the coefficients comprises clipping a plurality of AC coefficients that correspond to high frequencies.

9. The method of claim 7, wherein the clipping of the AC coefficients further comprises clipping a plurality of AC coefficients into different ranges based on a bit depth used in the quantizer.

10. The method of claim 7, wherein the performing of the entropy coding comprises performing the FLC on a DC coefficient and the clipped AC coefficients in the quantized transform block.

11. The method of claim 7, wherein the performing of the entropy coding comprises performing the VLC on the unclipped AC coefficients in the quantized transform block.

12. The method of claim 7, wherein the performing of the entropy coding comprises grouping variable length decoded coefficients separately from fixed length decoded coefficients to generate the bitstream.

13. At least one non-transitory computer readable recording medium comprising computer readable code to control at least one processing element to implement the method of claim 7.

14. An image decoding system, comprising:
   an entropy decoder to selectively perform dual entropy decoding using VLD (variable length decoding) and FLD (fixed length decoding) on a bitstream generated by selective performing of dual entropy coding using VLC and FLC on AC coefficients from a transform block;

an inverse clipper to inversely clip entropy-decoded data from the entropy decoder based on clipping information;

an inverse quantizer to inversely quantize inversely clipped entropy-decoded data to generate inversely quantized data; and an inverse transform unit to inversely transform the inversely quantized data to recover image data encoded into the bitstream.

15. The system of claim 14, wherein the entropy decoder performs the FLD on DC coefficients and AC coefficients identified as previously having been clipped during encoding, the encoding clipping having been performed after a quantization operation of the transform block during the encoding of the bitstream.

16. The system of claim 15, wherein the entropy decoder applies a pipe line process during the VLD.

17. The system of claim 14, wherein the entropy decoder performs the VLD on AC coefficients indicated as not having previously been clipped during encoding, with encoding clipping having been performed after a quantization operation of the transform block during the encoding of the bitstream.

18. The system of claim 14, wherein the inverse clipper selectively inversely clips fixed length decoded AC coefficients during the inverse clipping of the entropy-decoded data.

19. An image decoding method, comprising:
selectively performing, performed by a processing device, dual entropy decoding using VLD and FLD on a bitstream generated by selective performing of dual entropy coding of VLC and FLC on AC coefficients from a transform block, to generate entropy-decoded data;
inversely clipping the entropy-decoded data based on clipping information;
inversely quantizing inversely clipped entropy-decoded data to generate inversely quantized data; and
inversely transforming the inversely quantized data to recover image data encoded into the bitstream.

20. The method of claim 19, wherein the performing of the dual entropy decoding comprises performing the FLD on DC coefficients and AC coefficients identified as previously having been clipped during encoding, the clipping during encoding having been performed after a quantization operation of the transform block during the encoding of the bitstream.

21. The method of claim 19, wherein the performing of the dual entropy decoding comprises performing the VLD on AC coefficients identified as previously not having been clipped during encoding, with clipping during encoding having been performed after a quantization operation of the transform block during the encoding of the bitstream.

22. The method of claim 19, wherein the inversely clipping further comprises selectively inversely clipping variable length decoded AC coefficients.

23. At least one non-transitory computer readable recording medium comprising computer readable code to control at least one processing element to implement the method of claim 19.

24. A display driving apparatus, comprising:
an image encoder to encode an image by selectively applying VLC and FLC on AC coefficients in a transform block in a dual manner to generate a first bitstream for the encoded image; and
an image decoder to selectively apply VLD and FLD in a dual manner to a second bitstream to recover pixel data of a respective encoded image for display,
wherein the image encoder comprises:
a transform unit to transform image data to generate a transform block;
a quantizer to quantize the transform block;
a clipper to clip a portion of AC coefficients in the quantized transform block; and
an entropy encoder to selectively perform entropy coding of unclipped AC coefficients in the quantized transform block and clipped AC coefficients in the quantized transform block using the VLC and the FLC and to generate the first bitstream.

25. The display driving apparatus of claim 24, wherein the second bitstream is derived from the first bitstream.

26. The display driving apparatus of claim 24, further comprising:
a memory to store the first bitstream generated by the image encoder;
a writing controller to control the first bitstream generated by the image encoder to be written in the memory; and
a reading controller to control the first bitstream stored in the memory to be read,
wherein, for the selective application of VLD and FLD, the first bitstream is read from the memory under control of the reading controller.

27. The display driving apparatus of claim 24, further comprising:
a line memory to store the pixel data recovered by the image decoder; and
a display device to read out of the pixel data in units of line portions and to display the line portions.

28. The system of claim 24, wherein the entropy encoder groups variable length decoded coefficients separate from fixed length decoded coefficients to generate the bitstream.

29. A display driving apparatus, comprising:
an image encoder to encode an image by selectively applying VLC and FLC on AC coefficients in a transform block in a dual manner to generate a first bitstream for the encoded image; and
an image decoder to selectively apply VLD and FLD in a dual manner to a second bitstream to recover pixel data of a respective encoded image for display, wherein the image decoder comprises:
an entropy decoder to selectively perform dual entropy decoding using the VLD and FLD on the second bitstream, generated by selective performing of dual entropy coding of VLC and FLC on respective AC coefficients from a respective transform block;
an inverse clipper to inversely clip entropy-decoded data from the entropy decoder based on clipping information;
an inverse quantizer to inversely quantize inversely clipped entropy-decoded data to generate inversely quantized data; and
an inverse transform unit to inversely transform the inversely quantized data to recover image data encoded into the second bitstream.

30. A display driving method, comprising:
encoding, performed by a processing device, an image by selectively applying VLC and FLC on AC coefficients in a transform block in a dual manner to generate a first bitstream for the encoded image; and
decoding a second bitstream by selectively applying VLD and FLD on the second bitstream in a dual manner to recover pixel data of a respective encoded image for display,
wherein the encoding of an image comprises:
transforming image data to generate a transform block;
quantizing the transform block;
clipping a portion of AC coefficients in the quantized transform block; and selectively performing entropy coding of unclipped AC coefficients in the quantized transform block and clipped AC coefficients in the quantized transform block using the VLC and the FLC and generating the first bitstream.

31. The method of claim 30, wherein the second bitstream is derived from the first bitstream.

32. The method of claim 30, further comprising:
storing the first bitstream in a memory after the generating of the first bitstream; and
reading the second bitstream from the memory for the decoding of the second bitstream.

33. The method of claim 30, further comprising providing the pixel data in units of line portions to a display device to drive the display device for display of the image.

34. At least one non-transitory computer readable recording medium comprising computer readable code to control at least one processing element to implement the method of claim 30.

35. The method of claim 30, wherein the performing of the entropy coding comprises grouping variable length decoded coefficients separately from fixed length decoded coefficients to generate the bitstream.

36. A display driving method, comprising:
encoding, performed by a processing device, an image by selectively applying VLC and FLC on AC coefficients in a transform block in a dual manner to generate a first bitstream for the encoded image; and
decoding a second bitstream by selectively applying VLD and FLD on the second, bitstream in a dual manner to recover pixel data of a respective encoded image for, wherein the decoding of the second bitstream comprises:
selectively performing dual entropy decoding using VLD and FLD on the second bitstream, generated by selective performing of dual entropy coding of VLC and FLC on AC coefficients from a respective transform block to generate entropy-decoded data;
inversely clipping the entropy-decoded data based on clipping information;
inversely quantizing inversely clipped entropy-decoded data to generate inversely quantized data; and
inversely transforming the inversely quantized data to recover image data encoded into the second bitstream.

37. At least one non-transitory computer readable recording medium comprising an encoded image bitstream including encoded image data and control information to control a decoder in decoding the encoded image in the bitstream, with the encoded image bitstream being generated by transforming image data to generate a transform block, quantizing the transform block, clipping a portion of AC coefficients in the quantized transform block, and selective applying of VLC and FLC on unclipped AC coefficients in the quantized transform block and clipped AC coefficients in the quantized transform block for a line portion of a corresponding image.

* * * * *

UNITED STATES PATENT AND TRADEMARK OFFICE
CERTIFICATE OF CORRECTION

| | | |
|---|---|---|
| PATENT NO. | : 7,778,477 B2 | Page 1 of 1 |
| APPLICATION NO. | : 11/520745 | |
| DATED | : August 17, 2010 | |
| INVENTOR(S) | : Sangjo Lee et al. | |

It is certified that error appears in the above-identified patent and that said Letters Patent is hereby corrected as shown below:

Column 16, Line 2 delete "second," and insert -- second --, therefor.

Signed and Sealed this

Twenty-eighth Day of December, 2010

David J. Kappos
*Director of the United States Patent and Trademark Office*